Figure 4:
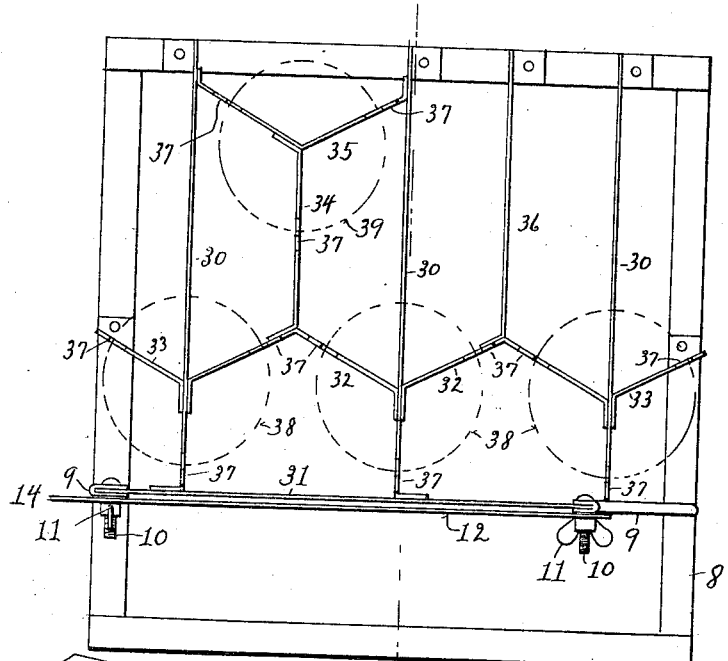

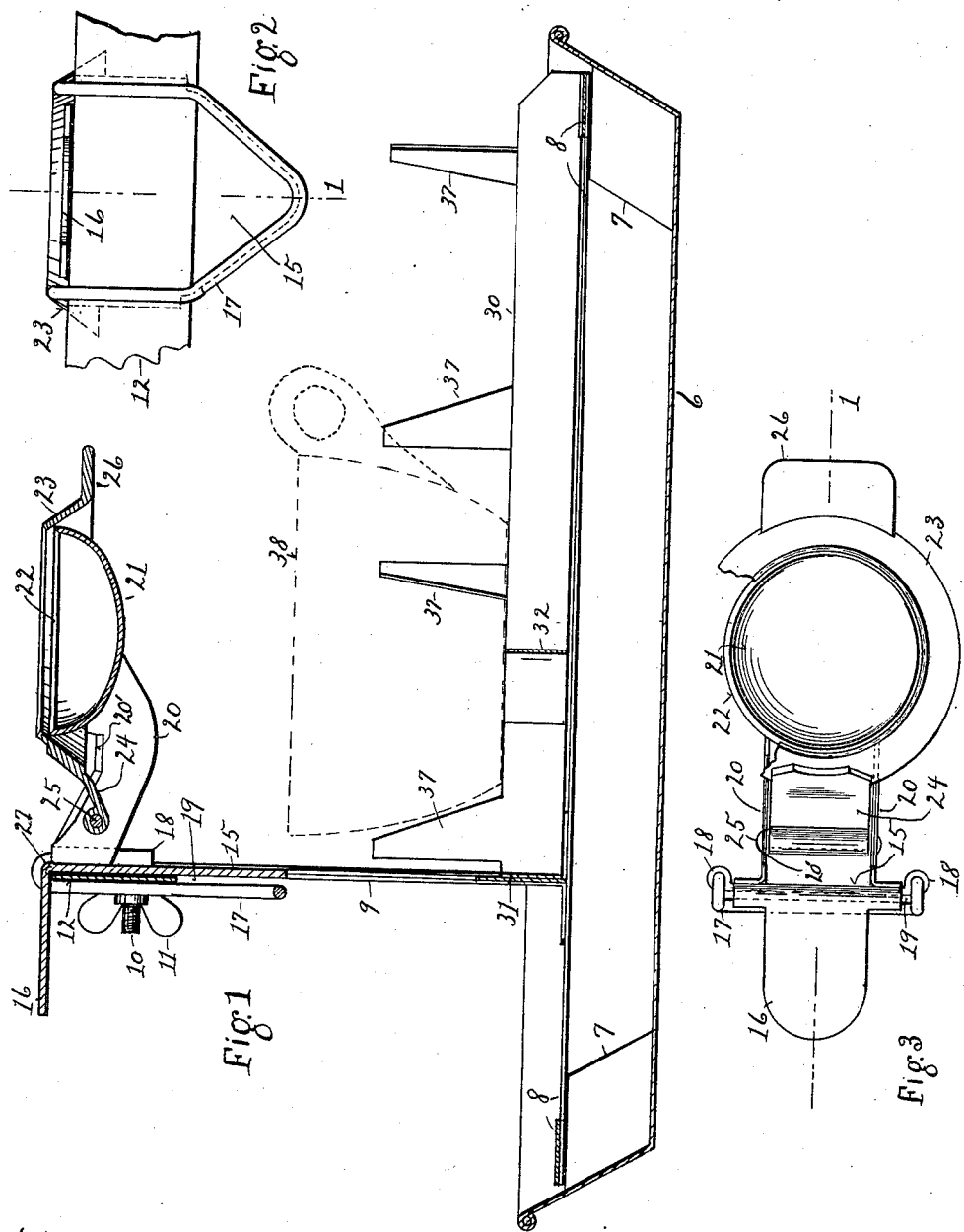

C. L. SVENSSON & H. A. PERRY.
SANITARY EGG SEPARATOR.
APPLICATION FILED SEPT. 21, 1911.

1,030,346.

Patented June 25, 1912.
2 SHEETS—SHEET 2.

Witnesses

Inventors

UNITED STATES PATENT OFFICE.

CARL L. SVENSSON AND HARRY A. PERRY, OF TOPEKA, KANSAS.

SANITARY EGG-SEPARATOR.

1,030,346.  Specification of Letters Patent.  Patented June 25, 1912.

Application filed September 21, 1911. Serial No. 650,516.

*To all whom it may concern:*

Be it known that we, CARL L. SVENSSON and HARRY A. PERRY, citizens of the United States, residing at Topeka, in the county of Shawnee and State of Kansas, have invented certain new and useful Improvements in Sanitary Egg-Separators, of which the following is a specification.

Our invention is a device for separating the white from the yolk of an egg.

The object of our invention is the rapid separation of eggs in a sanitary manner; especially it is the object of our invention to provide a device by which eggs can be separated rapidly in the commercial art, and in such manner that the hands of the operator need not come in contact with the yolk or white of the egg at any time during the separation, nor in contact with any part of the device which contacts with the egg.

It is a further object to provide a simple rack for holding a number of cups or other suitable receptacles, for receiving the parts of the eggs; also to provide a pan under the rack for catching the drippings which may thus be saved for various uses; also to provide the various parts, improvements, and combinations hereinafter set forth and claimed.

To these ends our invention comprises a bracket, a suitable bowl for receiving the entire contents of the shell in such manner that the white will hang over the sides of the bowl, and a ring pivoted to the bracket and capable of cutting the white from the yolk, so that the white will fall into the proper receptacle, the yolk being turned into another receptacle in the rack; it further comprises such a bowl and such a cutting ring; it further comprises a rack of peculiar construction; it also comprises the combination of the bowl, the cutting ring, the rack, and a pan; and it further comprises the parts, improvements, and combinations hereinafter set forth and claimed.

In the drawings accompanying and forming part of this specification, and in the description of the drawings, we have shown our invention in its preferred form, and have shown what we deem to be the best mode of applying the principles thereof; but it is to be understood that, within the scope of the appended claims, we contemplate changes in form, proportions, and materials, the transposition of parts, and the substitution of equivalent members, without departing from the spirit of our invention.

Figure 5:
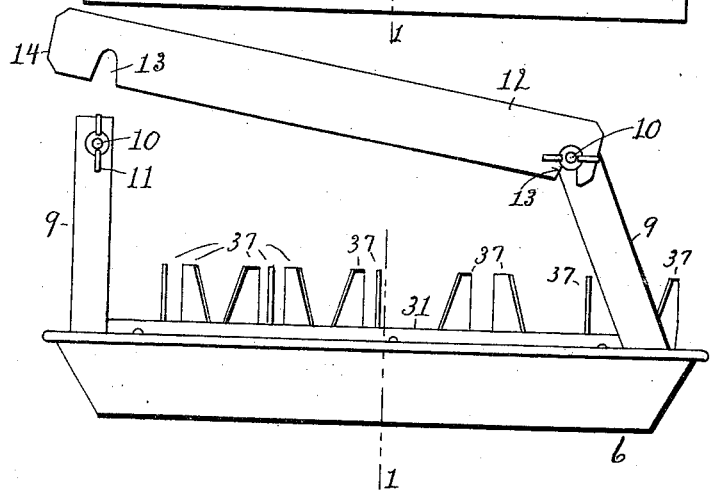

Figure 1 is a sectional elevation of a pan, rack, and separator, complete, made in accordance with the principles of our invention, a single cup being shown on the rack in dotted outline, the plane of the section being indicated by the lines 1 in the remaining figures. Fig. 2 is a rear elevation of the separator proper with a portion of the bar on which it is supported. Fig. 3 is a plan view of the separator proper, a portion of the cutting ring being broken away. Fig. 4 is a plan view of the rack, on a reduced scale. Fig. 5 is a rear elevation of the pan and rack, one end of the supporting and cutting bar being lifted up to show the manner of mounting it; this view being also on a reduced scale.

Similar reference characters indicate like or corresponding parts throughout the several views.

6 represents a pan of any suitable size, shape, and material and preferably provided at its corners with supports 7 for the rack frame 8. On the rack frame are mounted two standards 9, 9 in the upper end of each of which is secured a threaded bolt 10 onto which is screwed a thumb-nut 11.

12 is a bar of thin sheet metal having slots 13, 13 registering with the bolts, whereby the bar may be mounted on the standards, being secured firmly thereon by the thumb-nuts. One end 14 preferably projects beyond the standard so that the bar may be lifted off of the standards without taking hold of the intermediate part which is used for supporting the separator proper and also for breaking the eggs.

15 is a plate having its upper end 16 bent over to form a handle.

17 is a rod secured at its opposite ends in the bosses 18 formed in the plate, and bent over and downwardly parallel with the plate so as to form a slot 19 between the plate and the rod, the plate and the rod being of about the same contour on opposite sides of the slot, though obviously the exact shape is quite immaterial.

20, 20 are two arms or brackets secured to the plate and secured at their outer ends to the bowl 21, whose upper edge 22 is beveled or sharpened. This bowl is of a size about sufficient to hold the yolk of an egg.

23 is a cutting ring fitting down over the upper edges of the bowl, and so arranged as to come in contact with the edge of the bowl all around. The ring has an extension 24 by which it is pivoted on a pin 25 extending between the two arms or brackets 20. By thusly hinging the ring to the brackets, it may be turned back against the upper end 27 of the plate when an egg is being dropped into the bowl. The bowl being of the size stated permits the white to run over and hang down the sides; but ordinarily the white is not heavy enough to break loose and fall by its own weight; but, on turning the ring back down onto the bowl, the white is cut around the edge and falls.

26 is a handle for the ring for facilitating this movement of the ring, and also for permitting the operator to effect the movement without touching any part of the ring which contacts with the egg.

31 is a bar of thin sheet metal extending between the standards at their bases; 30, 30, 32, 32, 33, 33, 34, 35, and 36 are a series of thin sheet metal bars supported on the rack frame, and provided with standards 37, 37, for holding a number of cups, 38, or other suitable receptacles. Three of these cups may be placed along in front of the bar 12, so that the bowl will be suspended directly over one of them, or may be moved from one to another by merely shifting it along the bar, so that the white will fall into the cup when cut loose by the cutting ring. The thin sheet metal bars which are provided with standards are set on edge so as to be best adapted to permit whatever drippings fall to pass on down into the pan, and so as to contact as little as possible with the receptacles supported thereon.

The operator places the separator proper over the proper receptacle, say the middle one, with the cutting ring turned back; breaks the egg on the cutting bar 12; drops the entire contents of the shell into the bowl; turns down the cutting ring by means of the handle 26, which lets the white fall into the receptacle under the separator bowl; turns the bowl over, by means of the handle 16 to deposit the yolk into another of the receptacles; and then restores the separator proper on the bar 12 and turns back the cutting ring. Whatever parts fall, fall into the pan and may thus be saved. In case a bad egg is met with, it may be deposited in another cup without placing it in the bowl.

This operation may be performed rapidly, and at no time need the operator's fingers come in contact with the contents of the shell. The receptacles, such as glass cups, may be emptied from time to time. The bowl, which fits loosely on the bar, may be removed and cleaned readily; and so too may the cutting bar, the rack, and the pan.

Preferably the separator proper is made of tinned brass; and likewise the rack and the pan. The tin best withstands the chemical action of the eggs; but any suitable material will do.

What we claim is:

1. In combination, a pan capable of supporting a rack above its bottom; a rack comprising a frame supportable in the pan, two standards on the frame, a threaded bolt secured in the upper end of each standard, and a thumb-nut for each screw, a bar extended between the standards and having slots to engage the respective bolts, one end of the bar extending beyond the standard, a series of thin sheet metal bars set on edge and supported on the frame and provided with upwardly projecting standards to support a number of receptacles; a bracket detachably secured to the first-named bar capable of movement longitudinally of said bar, a bowl secured to the bracket above one of said receptacles, and a cutting ring pivoted to the bracket and adapted to engage with the upper edge of the bowl.

2. In combination, a pan, a rack removably supported in the pan and having an elevated egg-breaking and bracket-supporting bar, a bracket having a slot and fitting over said bar so as to be removable therefrom and movable longitudinally thereon, a bowl supported on the bracket, and a cutting ring pivoted to the bracket and engaging the upper edge of the bowl.

3. In combination, a frame having an elevated egg-breaking and bracket-supporting bar, a bracket having a slot and fitting over said bar so as to be removable therefrom and movable longitudinally thereon, a bowl supported on the bracket, and a cutting ring pivoted to the bracket and engaging the upper edge of the bowl.

4. In combination, a bowl of a size holding the yolk of an egg and having its entire upper edge sharpened, a bracket having a laterally-extending arm secured to the bowl under its said upper edge, and a ring engaging against said upper edge and pivoted to the bracket so as to be movable in a vertical plane.

5. In combination, a bowl having its upper edge sharpened, a bracket having laterally-extending arms supporting the bowl, and a ring engaging against said upper edge and having a laterally-extending arm pivoted to the bracket so as to be movable in a vertical plane.

6. In combination, a bowl that is semispherically shaped both inside and outside, a bracket having laterally-extending arms supporting the bowl, and a ring engaging against the upper edge of the bowl and having a laterally-extending arm pivoted to the bracket so as to be movable in a vertical plane.

In testimony whereof we have affixed our signatures in presence of two witnesses.

CARL L. SVENSSON.
HARRY A. PERRY.

Witnesses:
G. BOWMAN,
RALPH R. ROLLMAN.

Copies of this patent may be obtained for five cents each, by addressing the "Commissioner of Patents, Washington, D. C."